US009845159B2

(12) United States Patent
Suciu et al.

(10) Patent No.: US 9,845,159 B2
(45) Date of Patent: Dec. 19, 2017

(54) CONJOINED REVERSE CORE FLOW ENGINE ARRANGEMENT

(71) Applicant: United Technologies Corporation, Hartford, CT (US)

(72) Inventors: Gabriel L. Suciu, Glastonbury, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 962 days.

(21) Appl. No.: 14/190,175

(22) Filed: Feb. 26, 2014

(65) Prior Publication Data

US 2015/0121838 A1    May 7, 2015

Related U.S. Application Data

(60) Provisional application No. 61/773,898, filed on Mar. 7, 2013.

(51) Int. Cl.
| | |
|---|---|
| *B64D 29/06* | (2006.01) |
| *F02K 1/54* | (2006.01) |
| *F01D 13/00* | (2006.01) |
| *B64D 27/20* | (2006.01) |
| *F02K 1/52* | (2006.01) |
| *F02K 1/60* | (2006.01) |
| *F02K 1/64* | (2006.01) |

(52) U.S. Cl.
CPC ............ *B64D 29/06* (2013.01); *B64D 27/20* (2013.01); *F01D 13/003* (2013.01); *F02K 1/52* (2013.01); *F02K 1/54* (2013.01); *F02K 1/60* (2013.01); *F02K 1/64* (2013.01); *F05D 2250/314* (2013.01)

(58) Field of Classification Search
CPC ........ B64D 27/20; B64D 27/14; B64D 27/08; B64D 29/04; B64D 29/06; B64D 27/10; B64D 35/08; F01D 13/003; F01D 13/006; F02K 1/52; F02K 1/54; F02K 1/60; F02K 1/64; F02K 1/62; F02K 1/68; F02K 3/077; F02K 3/06; F05D 2250/314; F02C 6/00; F02C 7/36
See application file for complete search history.

(56) References Cited

U.S. PATENT DOCUMENTS

| | | | | |
|---|---|---|---|---|
| 2,380,889 A | * | 7/1945 | Waseige | B64D 35/06 180/315 |
| 2,863,620 A | * | 12/1958 | Vautier | B64D 27/20 244/15 |
| 3,060,685 A | * | 10/1962 | Tonnies | B64D 27/20 244/110 B |

(Continued)

FOREIGN PATENT DOCUMENTS

| | | | | |
|---|---|---|---|---|
| CA | 2507280 A1 | * | 11/2006 | ............ B64C 15/14 |
| ES | EP 2610164 A1 | * | 7/2013 | ............ B64C 1/06 |

(Continued)

*Primary Examiner* — Jason L Vaughan
(74) *Attorney, Agent, or Firm* — Kinney & Lange, P. A.

(57) ABSTRACT

A system of conjoined gas turbine engines has a first engine with a first propulsor having a first axis and a first engine core having a second axis, and a second engine with a second propulsor having a third axis and a second engine core having a fourth axis. The first axis and third axis are parallel to one another; and the second axis and fourth axis are angled from one another.

14 Claims, 4 Drawing Sheets

(56) References Cited

U.S. PATENT DOCUMENTS

| | | | | |
|---|---|---|---|---|
| 3,075,728 A * | 1/1963 | Kogan | B64D 27/20 | 244/55 |
| 3,099,425 A * | 7/1963 | Fricke | B64D 27/20 | 244/74 |
| 3,194,516 A * | 7/1965 | Messerschmitt | B64D 27/20 | 244/74 |
| 3,286,470 A * | 11/1966 | Gerlaugh | B64D 27/20 | 244/15 |
| 3,312,429 A * | 4/1967 | Hull, Jr. | F02K 1/68 | 239/265.29 |
| 3,936,017 A * | 2/1976 | Blythe | B64C 25/423 | 181/213 |
| 4,240,597 A * | 12/1980 | Ellis | B64C 3/14 | 244/198 |
| 4,311,289 A * | 1/1982 | Finch | B64C 3/10 | 244/130 |
| 4,365,773 A * | 12/1982 | Wolkovitch | B64C 39/068 | 244/123.7 |
| 4,500,055 A * | 2/1985 | Krojer | B64D 27/14 | 244/55 |
| 4,679,394 A * | 7/1987 | Taylor | B64C 29/0066 | 239/265.29 |
| 4,804,155 A * | 2/1989 | Strumbos | B64C 25/423 | 244/12.6 |
| 4,836,469 A * | 6/1989 | Wagenfeld | B64D 33/04 | 181/213 |
| 4,953,812 A * | 9/1990 | Van der Hoeven | B64D 27/14 | 244/119 |
| 4,976,396 A * | 12/1990 | Carlson | B64C 1/16 | 244/119 |
| 5,230,213 A * | 7/1993 | Lawson | F02K 1/563 | 244/110 B |
| 5,779,191 A * | 7/1998 | Brislawn | B64C 5/02 | 244/194 |
| 5,899,409 A * | 5/1999 | Frediani | B64C 39/068 | 244/13 |
| 5,943,856 A | 8/1999 | Lillibridge et al. | | |
| 5,957,405 A * | 9/1999 | Williams | B64C 1/00 | 244/15 |
| 6,199,795 B1 * | 3/2001 | Williams | B64C 1/00 | 244/130 |
| 6,487,845 B1 * | 12/2002 | Modglin | F02K 1/60 | 239/265.29 |
| 6,837,038 B2 * | 1/2005 | Eiler | B64D 27/02 | 239/265.17 |
| 7,726,602 B2 * | 6/2010 | Llamas Sandin | B64D 27/14 | 244/54 |
| 7,753,311 B2 * | 7/2010 | Gustafsson | B64D 33/04 | 244/53 R |
| 7,770,377 B2 * | 8/2010 | Rolt | F02K 3/06 | 60/226.1 |
| 7,900,865 B2 * | 3/2011 | Moore | B64C 39/12 | 244/1 N |
| 7,900,877 B1 * | 3/2011 | Guida | B64C 23/065 | 244/199.4 |
| 8,016,233 B2 * | 9/2011 | Moore | B64C 5/08 | 244/117 R |
| 8,051,639 B2 | 11/2011 | Lair | | |
| 8,074,924 B2 * | 12/2011 | Cros | B64C 5/06 | 244/13 |
| 8,087,607 B2 * | 1/2012 | Moore | B64C 39/12 | 244/1 N |
| 8,104,261 B2 | 1/2012 | Marshall et al. | | |
| 8,109,466 B2 | 2/2012 | Aten et al. | | |
| 8,128,023 B2 * | 3/2012 | Cazals | B64C 5/02 | 244/45 R |
| 8,151,551 B2 | 4/2012 | Pero | | |
| 8,172,175 B2 | 5/2012 | Lair | | |
| 8,176,725 B2 | 5/2012 | Norris et al. | | |
| 8,276,362 B2 | 10/2012 | Suciu et al. | | |
| 8,313,055 B2 * | 11/2012 | Gall | B64D 27/02 | 244/1 N |
| 8,336,289 B2 * | 12/2012 | Roberge | F02C 3/113 | 60/263 |
| 8,464,511 B1 * | 6/2013 | Ribarov | B64C 11/48 | 60/226.1 |
| 8,511,058 B2 * | 8/2013 | Agrawal | F02C 6/206 | 60/39.15 |
| 8,573,531 B2 * | 11/2013 | Cazals | B64D 27/20 | 244/54 |
| 8,628,040 B2 * | 1/2014 | Moore | B64D 27/20 | 244/1 N |
| 8,684,302 B2 * | 4/2014 | Chanez | B64C 1/0009 | 137/15.1 |
| 8,684,315 B2 * | 4/2014 | Guida | B64C 23/065 | 244/198 |
| 8,726,633 B2 * | 5/2014 | Roberge | F02C 3/113 | 60/226.1 |
| 8,783,010 B2 * | 7/2014 | Guillois | B64D 33/04 | 239/265.19 |
| 8,789,354 B2 * | 7/2014 | Suciu | F02K 3/025 | 60/224 |
| 8,955,304 B2 * | 2/2015 | Suciu | F02K 3/06 | 60/224 |
| 9,162,755 B2 * | 10/2015 | Guida | B64C 23/065 | |
| 9,352,843 B2 * | 5/2016 | Suciu | F02K 3/06 | |
| 2001/0011691 A1 * | 8/2001 | Provost | B64C 11/001 | 244/55 |
| 2006/0185346 A1 * | 8/2006 | Rolt | F02K 3/06 | 60/224 |
| 2007/0023571 A1 * | 2/2007 | Kawai | B64C 39/10 | 244/119 |
| 2007/0295860 A1 * | 12/2007 | Gustafsson | B64D 33/04 | 244/73 R |
| 2008/0191087 A1 * | 8/2008 | Cros | B64C 5/06 | 244/15 |
| 2009/0056309 A1 * | 3/2009 | Roberge | F02C 3/113 | 60/263 |
| 2009/0090811 A1 * | 4/2009 | Llamas Sandin | B64D 27/14 | 244/54 |
| 2009/0126341 A1 | 5/2009 | Lair | | |
| 2010/0038472 A1 * | 2/2010 | Cazals | B64D 27/20 | 244/54 |
| 2010/0096495 A1 * | 4/2010 | Lecordix | B64D 29/08 | 244/54 |
| 2012/0091270 A1 * | 4/2012 | Moore | B64D 27/20 | 244/1 N |
| 2013/0025286 A1 | 1/2013 | Kupratis | | |
| 2013/0056554 A1 * | 3/2013 | Guillois | B64D 33/04 | 239/265.19 |
| 2013/0056982 A1 * | 3/2013 | Gozdawa | F01D 15/10 | 290/7 |
| 2013/0214090 A1 * | 8/2013 | Folch Cortes | B64C 1/06 | 244/55 |
| 2014/0054413 A1 * | 2/2014 | Cazals | B64C 39/12 | 244/54 |
| 2014/0250863 A1 * | 9/2014 | Suciu | F02K 1/60 | 60/226.2 |
| 2014/0252167 A1 * | 9/2014 | Suciu | F02K 1/70 | 244/110 B |
| 2015/0121838 A1 * | 5/2015 | Suciu | B64D 27/20 | 60/39.15 |
| 2015/0121896 A1 * | 5/2015 | Suciu | F02K 1/605 | 60/796 |
| 2015/0240745 A1 * | 8/2015 | Lord | F01D 13/003 | 60/770 |
| 2016/0102634 A1 * | 4/2016 | Suciu | F01D 13/003 | 60/262 |

FOREIGN PATENT DOCUMENTS

| | | | | |
|---|---|---|---|---|
| FR | WO 2011135216 A1 * | 11/2011 | | B64D 33/04 |
| FR | WO 2012107650 A1 * | 8/2012 | | B64C 39/12 |

* cited by examiner

CONJOINED REVERSE CORE FLOW ENGINE ARRANGEMENT

CROSS-REFERENCE TO RELATED APPLICATION(S)

This application claims priority from U.S. Provisional Application No. 61/773,898, filed Mar. 7, 2013, for "CONJOINED REVERSE CORE FLOW ENGINE ARRANGEMENT".

BACKGROUND

This application relates generally to a gas turbine engine for an aircraft, and more specifically, to configuration of multiple engines mounted to a rear of the aircraft.

Gas turbine engines typically include a fan delivering air into a compressor section and also outwardly of the compressor as bypass air. Air from the compressor section passes into a combustor, is mixed with fuel, and ignited. Products of this combustion pass downstream over turbine rotors, driving them to rotate.

In typical gas turbine engines, the fan is positioned axially at a forward end of an engine, and a compressor section is attached downstream thereto. A combustor section and turbine section are located downstream of the compressor section in axial alignment so that the compressor section is nearer the fan than the combustor section or turbine section. In a reverse flow gas turbine engine, the turbine section is adjacent the fan, and the combustor section is at an inner end of the turbine section, with the compressor positioned farthest from the fan.

Gas turbine engines are required to be configures such that if one engine bursts, it does not affect operation (or severely damage) an adjacent engine. For example, FAA Advisory Circular AC 20-128A sets for recommendations and requirements for placement of multiple gas turbine engines on an aircraft. Thus, designing to place engines in the same proximity is difficult.

SUMMARY

In one embodiment, a system of conjoined gas turbine engines has a first engine with a first propulsor having a first axis and a first engine core having a second axis, and a second engine with a second propulsor having a third axis and a second engine core having a fourth axis. The first axis and third axis are parallel to one another; and the second axis and fourth axis are angled from one another.

In another embodiment, an aircraft has a main body fuselage with a first engine mounted to the fuselage, the first engine having a first propulsor having a first axis and a first engine core having a second axis, and a second engine mounted adjacent the first engine, the second engine having a second propulsor having a third axis and a second engine core having a fourth axis. The first axis and third axis are parallel to one another, and the second axis and fourth axis are angled from one another.

In yet another embodiment, a system of adjacent gas turbine engines mounted to a rear of an aircraft fuselage is disclosed. The system has a first engine with a first engine core and a second engine with a second engine core, wherein the first engine core and second engine core are not affected by an uncontained rotor failure of the adjacent engine.

DETAILED DESCRIPTION

As disclosed herein, cores of two different engines are oriented such that the burst zone of each respective engine will not affect operation of the adjacent engine if a problem occurs. Cores have an inclined orientation so as to be angled away from one another. Thrust reverser panels are also present that will not be affected if a problem occurs with an adjacent engine. Thus, the design of an aircraft with adjacent or close proximity engines is possible.

Figure 1:
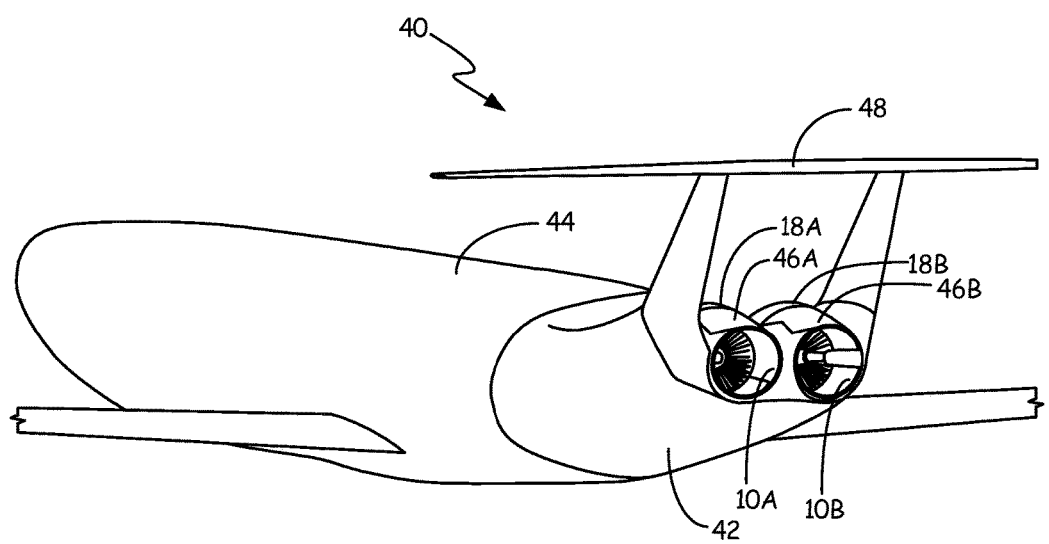
FIG. 1 is a perspective view of an aircraft with conjoined engines mounted on the rear of the fuselage.

FIG. 1 illustrates an aircraft 40 with conjoined engines 10A and 10B mounted on a rear 42 of a fuselage 44. The aircraft has engine mount locations for engines 10A and 10B between a portion of a tail 48. At the mounting location, certain positioning restrictions are present on the engine. Conjoined engines 10A and 10B each have nacelles 18A and 18B that are attached to, or that include, thrust reversers 46A and 46B. The thrust reversers 46A and 46B contain flow blocking doors that may be deployed to inhibit and reverse the flow of the engines 10A and 10B.

Figure 2:
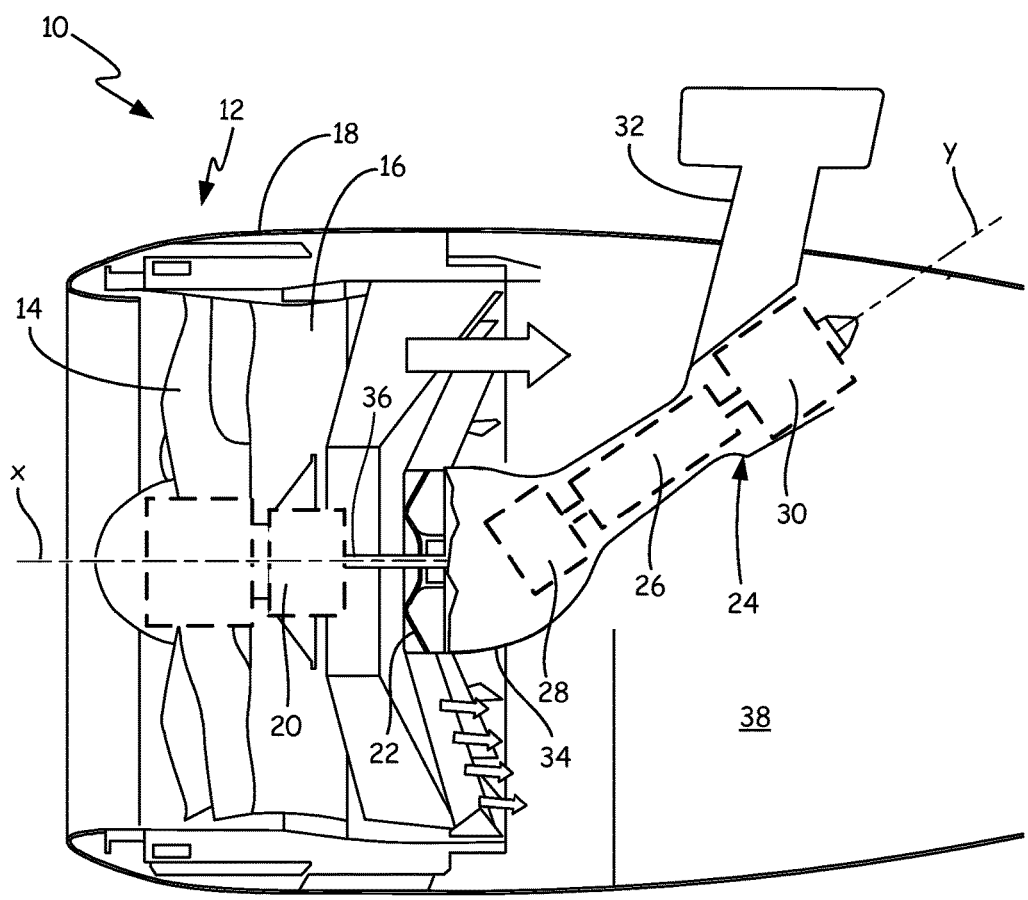
FIG. 2 is a schematic plan view of a reverse core engine.

FIG. 2 is a plan schematic view of a reverse core engine. Engine 10 includes a propulsor 12 at a forward end which is centered for rotation about an axis X. Propulsor 12 includes a fan 14 and a nozzle 16 rearward thereof surrounded by a nacelle 18. Axis X is also a central axis of the fan and the nozzle. Engine 10 may include a gear reduction 20 driven by a power turbine section 22 to drive the fan 14.

A core engine 24 includes combustion section 26 positioned between a turbine section 28 and a compressor section 30. The core engine 24 may also be referred to as the gas generator of the turbine engine. Air passes into an inlet duct 32 to be delivered to the compressor 30. The duct 32 has a limited cross sectional area. At other circumferential locations within nacelle 18, air flows as bypass air for propulsion. The air is compressed and delivered into combustion section 26, where it mixes with fuel and is ignited. Products of this combustion pass through turbine section 28, which drives compressor section 30. The products of combustion then pass through a transition duct 34 over power turbine section 22, to drive the fan 14 that is connected by thereto by a propulsor shaft 36. Air then exits the power turbine 22 and is exhausted therefrom, such as by having a turbine nozzle that directs the flow aftward upon leaving the power turbine 22. The exhaust from the core engine 24 may be mixed with the bypass flow from the propulsor 12 as it leaves the power turbine 22, creating a single exhaust airflow from engine 10.

The illustrated gas turbine engine is a "reverse flow engine" in that the compressor 30 is positioned further into (forward to aft) the engine than is the turbine 28. That is, the turbine section 28 is closest to the propulsor 12, the combustor section 26 and the compressor section 30 are positioned further away in the downstream or aft direction of the propulsor 12 relative to the turbine section 28.

The engine 10 is positioned such that the fan 12, the gear 20, and the power turbine 22 are positioned centered on the axis X, while the core engine 24, including the compressor section 26, the combustor section 24, and the turbine section 28, is positioned on a non-parallel axis Y. The core engine 24 may be mounted in some manner to the nozzle 16, such as through transition duct 34.

In an engine that is reverse flow, and in particular in one wherein the axes X and Y are not parallel, a relatively long core engine 24 can be achieved without the core engine blocking the exit area 38. However, the overall length of the engine 10 is reduced as the core engine 24 is mounted at an angle with respect to the propulsor 12.

Figure 3:
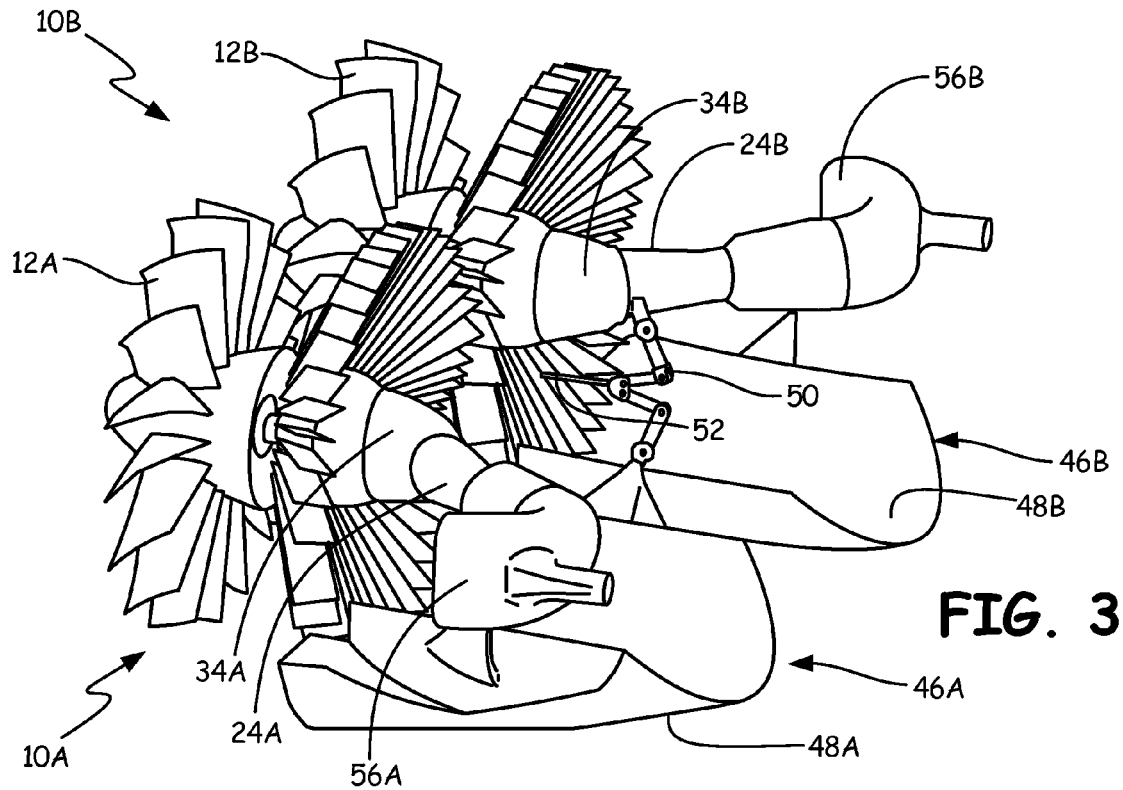
FIG. 3 is a perspective view of the conjoined engines without a nacelle.
Figure 4:
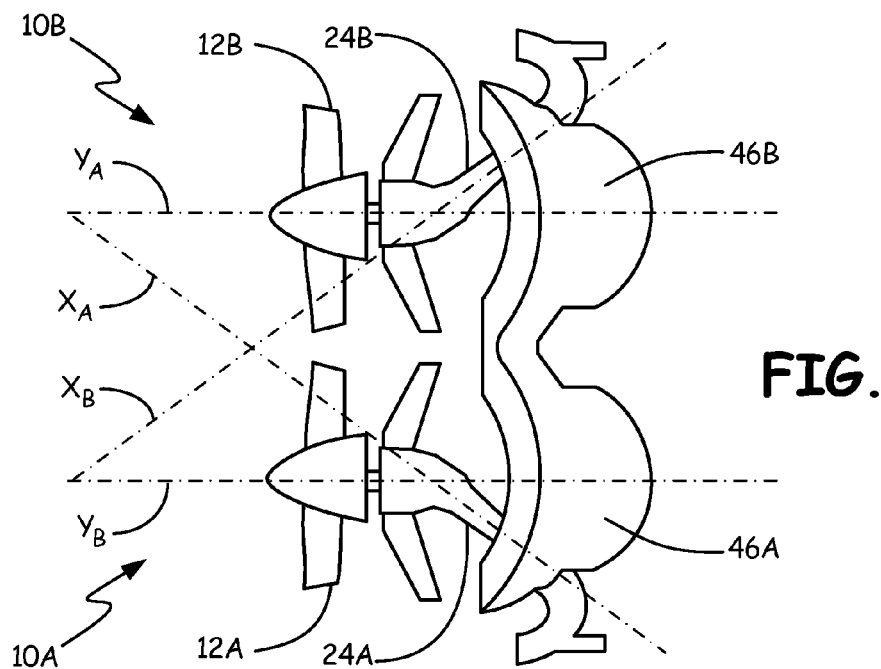
FIG. 4 is a plan view of the arrangement of the conjoined engines with a portion of the nacelle removed.

FIG. 3 is a perspective view of the conjoined engines 10A and 10B without the majority of nacelles 18, and FIG. 4 is a plan view of the arrangement of the conjoined engines 10A and 10B. Illustrated are engines 10A and 10B, each with the propulsors 12A and 12B connected to the core engines 24A and 24B via transition ducts 34A and 34B, respectively. Also illustrated are doors 48A and 48B of the thrust reversers 46A and 46B. Once an aircraft associated with the engines 10A and 10B has landed, the actuation mechanism 52 drives the linkage system 50 into a deployed position (see FIG. 5) to activate the thrust reversers 46A and 46B.

In the disclosed arrangement of the engines 10A and 10B conjoined and mounted to the rear 42 of the aircraft 40, the core engines 24A and 24B are angled to be generally parallel with the ground, with the compressor section flow inlets 56A and 56B on the outer sides of the engines 10A and 10B with respect to the aircraft 40.

The engines 10A and 10B are positioned such that the propulsors 12A and 12B area centered on the axes $X_A$ and $X_B$, which are generally parallel to one another. The core engines 24A and 24B, including the compressor section 26, the combustor section 24, and the turbine section 28, are positioned axes $Y_A$ and $Y_B$, which are at an angle with respect to axes $X_A$ and $X_B$ as well as with respect to one another. Generally, when a rotor or other component of the core engines 24A or 24B fails, pieces that escape are bunched into what is referred to as a burst zone. This may be also be referred to as an uncontained rotor failure. Due to the centrifugal nature of turbine engines, the burst zone is generally perpendicular to the engine axis. For the high speed components of the core engines 24A and 24B, the burst zones are perpendicular to axes $Y_A$ and $Y_B$. Thus, by setting the axes $Y_A$ and $Y_B$ at angles with respect to one another, expected damage from a component failure is minimized.

In an engine that is reverse flow, and in particular in one wherein the axes X and Y are not parallel, a relatively long core engine 24 can be achieved without the core engine 24 blocking the exit area 38. However, the overall length of the engine 10 is reduced as the core engine 24 is mounted at an angle with respect to the propulsor 12. Thus, with two cores 24A and 24B angled away from one another, two relatively short engines may be placed in proximity to one another without the worry of overlapping burst zones.

Figure 5:
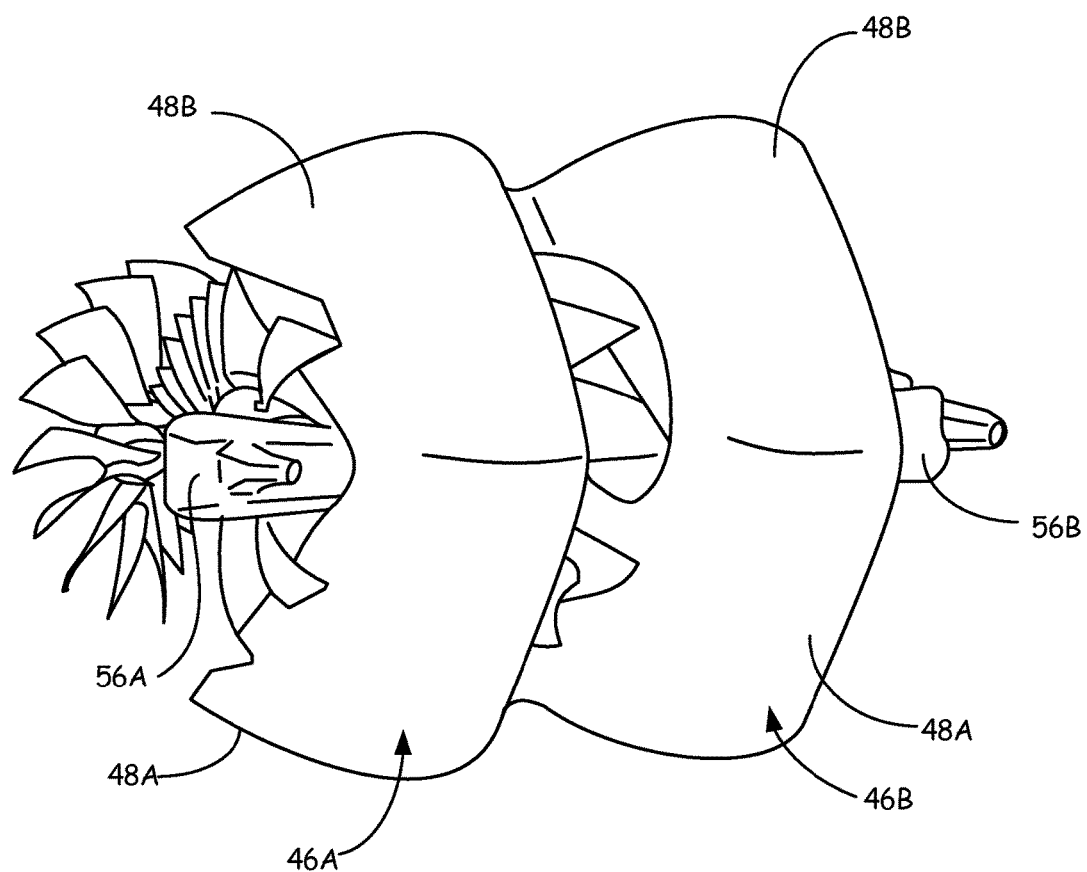
FIG. 5 is a perspective view of the arrangement of conjoined engines with thrust reversers in a deployed position.

FIG. 5 is a perspective view of the arrangement of conjoined engines 10A and 10B with thrust reversers 46A and 46B in a deployed position. The doors 48A and 48B are pivoted to a deployed position to block the exit area of the engines 10A and 10B. The propulsor 12 and turbine section 28 continue to deliver exhaust gas against the deployed doors 48A and 48B, and create a reverse thrust tending to slow the aircraft. With this configuration, the pivoting doors 48A and 48B are centrally located adjacent either at the top dead center or bottom dead center of the engines 10A and 10B. When deployed, the thrust reverser 46 will move the pivoting doors 48A and 48B in a general vertical direction.

Once in the deployed position, the doors 48A and 48B will block both the bypass flow from the propulsor 12 and the exit flow from the turbine 28. The angle of the core engine 24 allows for the full closure or pivoting of the doors 48A and 48B behind the core engine 24 while not interfering or disrupting inlet flow from the side thereof at the compressor flow inlets 56A and 56B, or contacting the core engine 24 in the deployed position. The angled core engine 24 shortens the overall length of the engine 10. The system provides enhances thrust reverse for the engine 10 as only one structure is needed to block both bypass flow and core engine exhaust flow due to the shortened length of the engine. Further, fewer parts are required for the engine as the doors of the thrust reverser are incorporated into the nacelle or cowl and serve a dual function. As a result, the weight of the engine is greatly reduced, and thus the thrust reverser 46 arrangement proportionally reduces the amount of fuel burned during flight.

The configuration of putting multiple engines at the rear of an aircraft creates an issue with operable space for deploying the thrust reversers of adjacent engines. The vertical operation of the thrust reversers 46A and 46B also allow for the conjoined arrangement of the engines 10A and 10B at the rear 42 of the aircraft 40. Further, having core engines 24A and 24B set at an angle with respect to one another assure that a potential failure of one engine does not interfere with the operation of either the engine or thrust reverser of an adjacent engine. Although illustrated as two engines, three or more engines could be mounted to the back of the aircraft in varying arrangements (in a line, in an arc, in a pyramid, etc.) without the worry of thrust reversers or burst zones interfering with adjacent engines.

Discussion of Possible Embodiments

The following are non-exclusive descriptions of possible embodiments of the present invention.

In one embodiment, a system of conjoined gas turbine engines has a first engine with a first propulsor having a first axis and a first engine core having a second axis, and a second engine with a second propulsor having a third axis and a second engine core having a fourth axis. The first axis and third axis are parallel to one another; and the second axis and fourth axis are angled from one another.

The system of the preceding paragraph can optionally include, additionally and/or alternatively, any one or more of the following features, configurations and/or additional components:

wherein the first axis and the second axis are non-parallel;

wherein the third axis and the fourth axis are non-parallel;

wherein the first engine core and the second engine core each include a compressor section, a combustor section, and a turbine section, with the turbine section being closer to the respective propulsor than the compressor section;

wherein the first engine core is aerodynamically connected to the first propulsor, and the second engine core is aerodynamically connected to the second propulsor;

wherein the first propulsor delivers bypass air of the first engine;

a first nacelle positioned around the first propulsor and the first engine core, wherein a downstream end of the first nacelle has a first thrust reverser with at least one pivoting door with an actuation mechanism to pivot the at least one door between a stowed position and a deployed position in which the at least one door inhibits a flow to provide a thrust reverse of a flow of the first engine;

a second nacelle positioned around the second propulsor and the second engine core, wherein a downstream end of the second nacelle has a second thrust reverser with at least one pivoting door with an actuation mechanism to pivot the at least one door between a stowed position and a deployed position in which the at least one door inhibits a flow to provide a thrust reverse of a flow of the second engine; and/or wherein the first thrust reverser and second thrust reverser are positioned with respect to first engine core and second engine core so that the first thrust reverser and second thrust reverser are not affected by an uncontained rotor failure of the adjacent engine.

In another embodiment, an aircraft has a main body fuselage with a first engine mounted to the fuselage, the first engine having a first propulsor having a first axis and a first engine core having a second axis, and a second engine mounted adjacent the first engine, the second engine having a second propulsor having a third axis and a second engine core having a fourth axis. The first axis and third axis are parallel to one another, and the second axis and fourth axis are angled from one another.

The aircraft of the preceding paragraph can optionally include, additionally and/or alternatively, any one or more of the following features, configurations and/or additional components:

wherein the first axis and the second axis are non-parallel;

wherein the third axis and the fourth axis are non-parallel;

wherein the first engine core and the second engine core each include a compressor section, a combustor section, and a turbine section, with the turbine section being closer to the respective propulsor than the compressor section;

wherein the first engine core is aerodynamically connected to the first propulsor, and the second engine core is aerodynamically connected to the second propulsor;

wherein the first propulsor delivers air bypass air of the first engine;

a first nacelle positioned around the first propulsor and the first engine core, wherein a downstream end of the first nacelle has a first thrust reverser with at least one pivoting door with an actuation mechanism to pivot the at least one door between a stowed position and a deployed position in which the at least one door inhibits a flow to provide a thrust reverse of a flow of the first engine;

a second nacelle positioned around the second propulsor and the second engine core, wherein a downstream end of the second nacelle has a second thrust reverser with at least one pivoting door with an actuation mechanism to pivot the at least one door between a stowed position and a deployed position in which the at least one door inhibits a flow to provide a thrust reverse of a flow of the second engine; and/or wherein the first thrust reverser and second thrust reverser are positioned with respect to first engine core and second engine core so that the first thrust reverser and second thrust reverser are not affected by an uncontained rotor failure of the adjacent engine.

In yet another embodiment, a system of adjacent gas turbine engines mounted to a rear of an aircraft fuselage is disclosed. The system has a first engine with a first engine core and a second engine with a second engine core, wherein the first engine core and second engine core are not affected by an uncontained rotor failure of the adjacent engine.

Although the present invention has been described with reference to preferred embodiments, workers skilled in the art will recognize that changes may be made in form and detail without departing from the spirit and scope of the invention.

The invention claimed is:

1. A system of conjoined gas turbine engines, the system comprising:

a first engine with a first propulsor having a first axis and a first engine core having a second axis;

a second engine with a second propulsor having a third axis and a second engine core having a fourth axis;

wherein the first axis and third axis are parallel to one another; and wherein the second axis and fourth axis are angled from one another, such that the first engine core diverges from the second engine core in an axially aft direction;

wherein the first engine core and the second engine core each include a compressor section, a combustor section, and a turbine section, with the turbine section being closer to the respective propulsor than the compressor section;

wherein the first engine core is aerodynamically connected to the first propulsor, and the second engine core is aerodynamically connected to the second propulsor; and wherein the first propulsor provides bypass air of the first engine.

2. The system of claim 1, wherein the first axis and the second axis are non-parallel.

3. The system of claim 1, wherein the third axis and the fourth axis are non-parallel.

4. The system of claim 1 further comprising:

a first nacelle positioned around the first propulsor and the first engine core, wherein a downstream end of the first nacelle has a first thrust reverser with at least one pivoting door with an actuation mechanism to pivot the at least one pivoting door between a stowed position and a deployed position in which the at least one door inhibits a flow to provide a thrust reverse of a flow of the first engine.

5. The system of claim 4 further comprising:

a second nacelle positioned around the second propulsor and the second engine core, wherein a downstream end of the second nacelle has a second thrust reverser with at least one pivoting door with an actuation mechanism to pivot the at least one door between a stowed position and a deployed position in which the at least one door inhibits a flow to provide a thrust reverse of a flow of the second engine.

6. The system of claim 5, wherein the first thrust reverser and second thrust reverser are positioned with respect to first engine core and second engine core so that the first thrust reverser and second thrust reverser are not affected by an uncontained rotor failure of the adjacent engine.

7. An aircraft comprising:

a main body fuselage;

a first engine mounted to the fuselage, the first engine having a first propulsor having a first axis and a first engine core having a second axis;

a second engine mounted adjacent the first engine, the second engine having a second propulsor having a third axis and a second engine core having a fourth axis;

wherein the first engine core and the second engine core are disposed generally parallel to a horizontal plane of the aircraft;

wherein the first axis and third axis are parallel to one another; and wherein the second axis and fourth axis are angled from one another such that the first engine core diverges from the second engine core in an axially aft direction;

wherein the first engine core and the second engine core each include a compressor section, a combustor section, and a turbine section, with the turbine section being closer to the respective propulsor than the compressor section;

wherein the first engine core is aerodynamically connected to the first propulsor, and the second engine core is aerodynamically connected to the second propulsor; and wherein the first propulsor delivers a bypass flow of the first engine.

8. The aircraft of claim 7, wherein the first axis and the second axis are non-parallel.

9. The aircraft of claim 7, wherein the third axis and the fourth axis are non-parallel.

10. The aircraft of claim 7 further comprising:

a first nacelle positioned around the first propulsor and the first engine core, wherein a downstream end of the first nacelle has a first thrust reverser with at least one pivoting door with an actuation mechanism to pivot the at least one door between a stowed position and a deployed position in which the at least one door inhibits a flow to provide a thrust reverse of a flow of the first engine.

11. The aircraft of claim 10 further comprising:

a second nacelle positioned around the second propulsor and the second engine core, wherein a downstream end of the second nacelle has a second thrust reverser with at least one pivoting door with an actuation mechanism to pivot the at least one door between a stowed position and a deployed position in which the at least one door inhibits a flow to provide a thrust reverse of a flow of the second engine.

12. The aircraft of claim 11, wherein the first thrust reverser and second thrust reverser are positioned with respect to first engine core and second engine core so that the first thrust reverser and second thrust reverser are not affected by an uncontained rotor failure of the adjacent engine.

13. A system of adjacent gas turbine engines mounted to a rear of an aircraft fuselage, the system comprising:

a first engine with a first propulsor and a first engine core; and a second engine with a second propulsor and a second engine core;

wherein the first engine core and second engine core are not affected by an uncontained rotor failure of the adjacent engine;

wherein the first engine core and the second engine core each include a compressor section, a combustor section, and a turbine section, with the turbine section being closer to the respective propulsor than the compressor section;

wherein the first engine core is aerodynamically connected to the first propulsor, and the second engine core is aerodynamically connected to the second propulsor; and wherein the first propulsor delivers a bypass flow of the first engine.

14. A system of adjacent gas turbine engines mounted to a rear of an aircraft fuselage, the system comprising:

a first engine with a first propulsor and a first engine core; and a second engine with a second propulsor and a second engine core;

wherein the first engine core and second engine core are positioned such that each of the first engine and second engine is out of a burst zone of the adjacent engine;

wherein the first engine core and the second engine core each include a compressor section, a combustor section, and a turbine section, with the turbine section being closer to the respective propulsor than the compressor section;

wherein the first engine core is aerodynamically connected to the first propulsor, and the second engine core is aerodynamically connected to the second propulsor; and wherein the first propulsor delivers a bypass flow of the first engine.

* * * * *